United States Patent [19]

Liethen

[11] Patent Number: 5,188,419
[45] Date of Patent: Feb. 23, 1993

[54] APPARATUS FOR PROVIDING INTERIOR LIGHT TO A VEHICLE

[75] Inventor: Thomas R. Liethen, Renton, Wash.

[73] Assignee: Paccar Inc., Bellevue, Wash.

[21] Appl. No.: 817,766

[22] Filed: Jan. 8, 1992

[51] Int. Cl.⁵ .......................................... B62D 27/00
[52] U.S. Cl. ........................... 296/190; 296/96.12; 296/96.19
[58] Field of Search ............... 296/190, 200, 84.1, 296/96.18, 96.19, 97.1, 96.12

[56] References Cited

U.S. PATENT DOCUMENTS

| | | | |
|---|---|---|---|
| D. 148,346 | 1/1948 | Ackermans | D14/3 |
| D. 198,903 | 8/1964 | Jones | D14/3 |
| 1,552,196 | 9/1925 | Bastis | 296/96.19 |
| 1,898,276 | 2/1933 | Van Dresser | 296/97.8 |
| 2,020,346 | 11/1935 | Ackermans | 296/210 |
| 2,257,951 | 10/1941 | Haberstump | 296/84 |
| 2,359,246 | 9/1944 | Rossell et al. | 296/97.1 |
| 2,863,697 | 12/1958 | Watkins | 296/97.2 |
| 4,201,415 | 5/1980 | Suchanek | 296/190 |
| 4,674,789 | 6/1987 | Watjer et al. | 296/97.1 |

*Primary Examiner*—Robert R. Song
*Attorney, Agent, or Firm*—Seed & Berry

[57] ABSTRACT

An apparatus which increases the amount of daylight entering a truck cab to provide additional cab illumination without directly shining on an operator, including a window located above the windshield and a header extending from the bottom part of the window into the vehicle cab to block the daylight from directly shining on an operator, in one embodiment of which the windshield and window are one piece of glass and include a glass area for marker lights.

15 Claims, 3 Drawing Sheets

APPARATUS FOR PROVIDING INTERIOR LIGHT TO A VEHICLE

DESCRIPTION

1. Technical Field

This invention generally relates to truck cabs. More particularly, it relates to an apparatus for providing daylight to the interior of an enlarged truck cab.

2. Background of the Invention

When compared to the front compartment of cars, modern truck cabs are quite large. In particular, those truck cabs typically used for long-distance freight hauling can be quite voluminous, since they frequently contain sleeper compartments wherein one operator can rest while another drives the truck. It is desirable to adequately light the areas in the cab without directly impacting the light on the operator's vision.

The need for more light is increased when the vehicle cab ceiling is raised to coincide with an elevated modern aerodynamic fairing. While a number of lamps are available which can increase the illumination within a cab, their use requires additional cost, fixtures, wiring, and replacements for burned-out bulbs. Additionally, natural sunlight is a useful and aesthetically pleasing light source. One method for increasing the amount of light interior to vehicle cabs would be to use a light transmissive material above the operator to form the cab exterior so that daylight floods the interior of the cab. This method, however, has a serious drawback in that the daylight will frequently shine directly on the operator, thereby creating visibility difficulties for the driver.

SUMMARY OF THE INVENTION

It is an object of the present invention to increase the illumination within a truck cab without degrading the visibility of the operator.

It is another object of the invention to increase the amount of daylight entering a truck cab.

These objects of the present invention are accomplished in accordance with the teachings of this invention by providing a light transmissive window above the front windshield to direct daylight into the cab while also providing a header underneath the window to block the daylight from directly shining on the operator. In a preferred embodiment the window and header are used in an enlarged cab having an integral sleeper compartment whereby the header does not block the daylight from entering the sleeper compartment. In one embodiment the window and the header extend substantially across the entire width of the cab, whereby the passenger's side also enjoys the increased lighting. In another embodiment the windshield and window are combined into one large piece of glass and include an area to shield marker lights located in the cab.

The novel features and the advantages of the invention will be understood more fully after reading the following detailed description and after reference to the accompanying drawings.

DETAILED DESCRIPTION OF THE INVENTION

Figure 1:
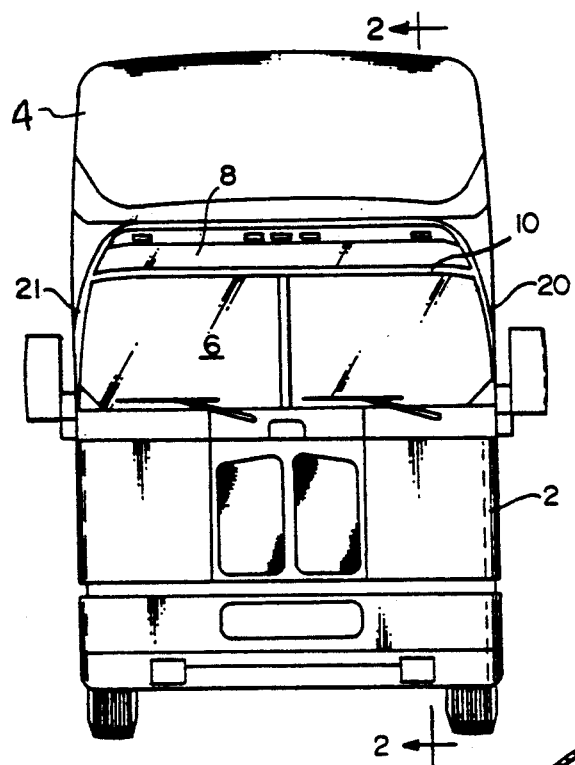
FIG. 1 is a front elevation of a truck cab embodying the invention.

Referring now to FIG. 1, the present invention is used as part of a truck cab 2. The truck cab includes a fairing 4 which forms the upper surface of the truck cab. This truck cab includes a front windshield 6 substantially similar to that used in known truck cabs.

Above the windshield 6 is located a window 8 separated from the windshield 6 by a separator 10. The combination of the windshield and the window permits substantially more daylight to enter the truck cab than would the windshield 6 alone.

Figure 2:
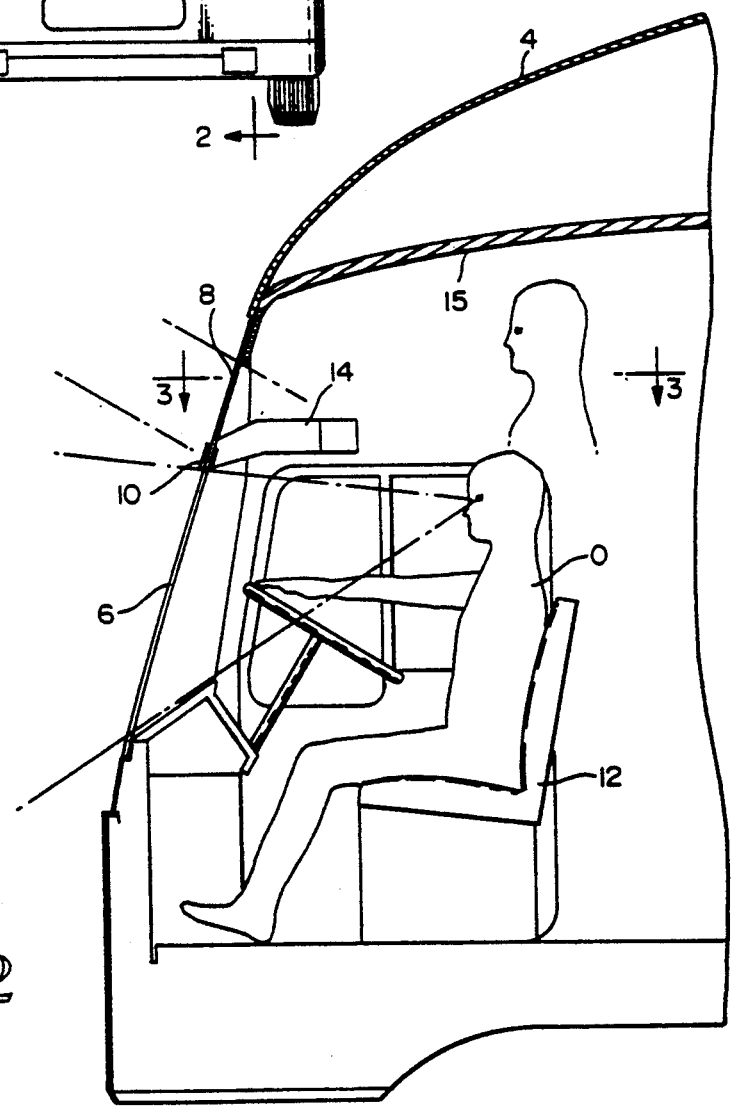
FIG. 2 is a side elevation taken along the line 2—2 of FIG. 1 with parts broken away for clarity.
Figure 4:
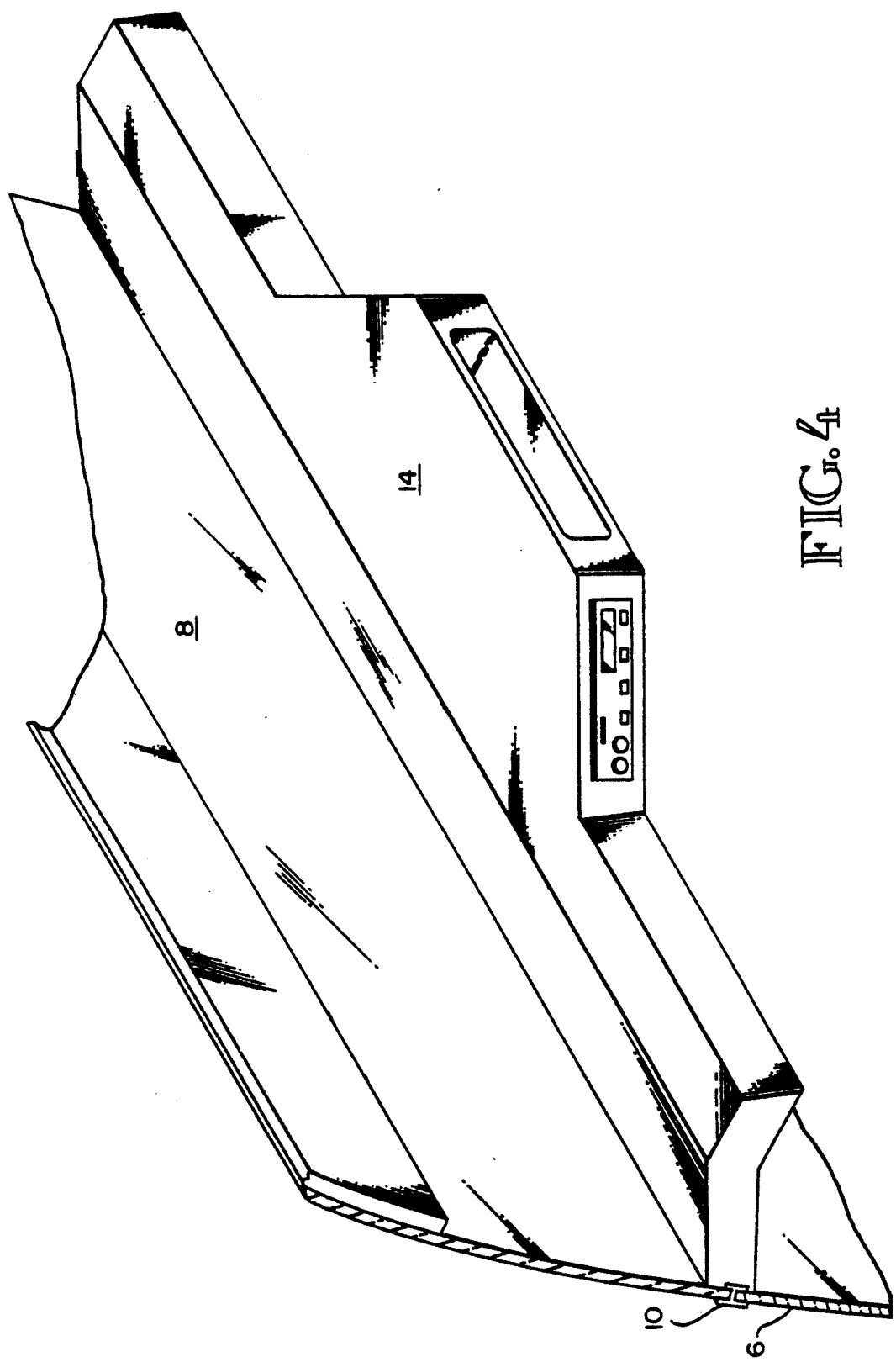
FIG. 4 is a fragmentary isometric of the cab showing the principles of the invention.

Referring now to FIG. 2, the truck cab includes an operator seat 12. The windshield 6 is located relative to the operator seat 12 so that the window 8 is located above the head of a seated operator 0.

Extending into the cab from the separator 10 is an opaque header 14. The header extends sufficiently into the cab so that daylight entering the window 8 at any angle of incidence is blocked by the header from directly shining on the operator's eyes.

In the embodiment shown in FIG. 2 a ceiling 15 is provided below the fairing 4 or roof of the cab. In the embodiment shown in FIG. 5 the ceiling is coincident with the fairing 4. Preferably the header will extend rearwardly from the window at least one third of the horizontal fore and aft length of the operator's door.

The header 14 extends transversely from above the operator door 20 to the passenger door 21. Thus, the entering light is prevented from directly shining on both the operator and a seated passenger. Except for the area around the operator and passenger, the daylight passing through the window 8 is free to illuminate the remainder of the truck cab 2.

Figure 5:
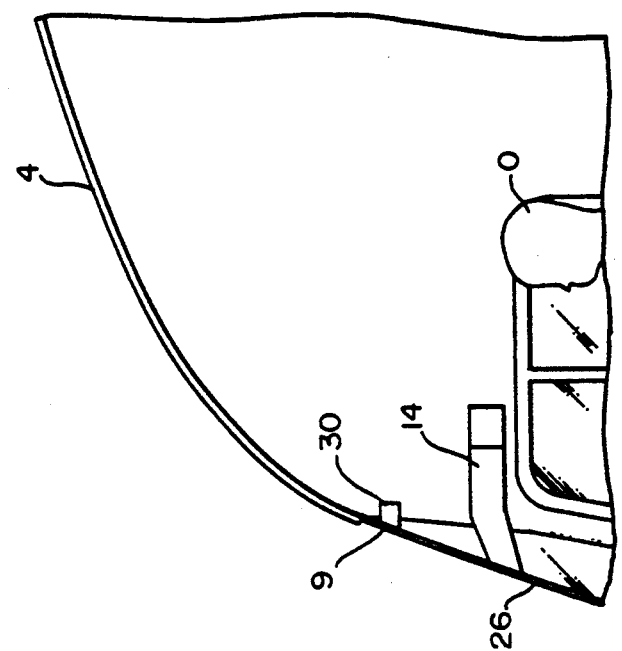
FIG. 5 is a fragmentary side elevation with parts broken away showing a second embodiment of the cab.
Figure 3:
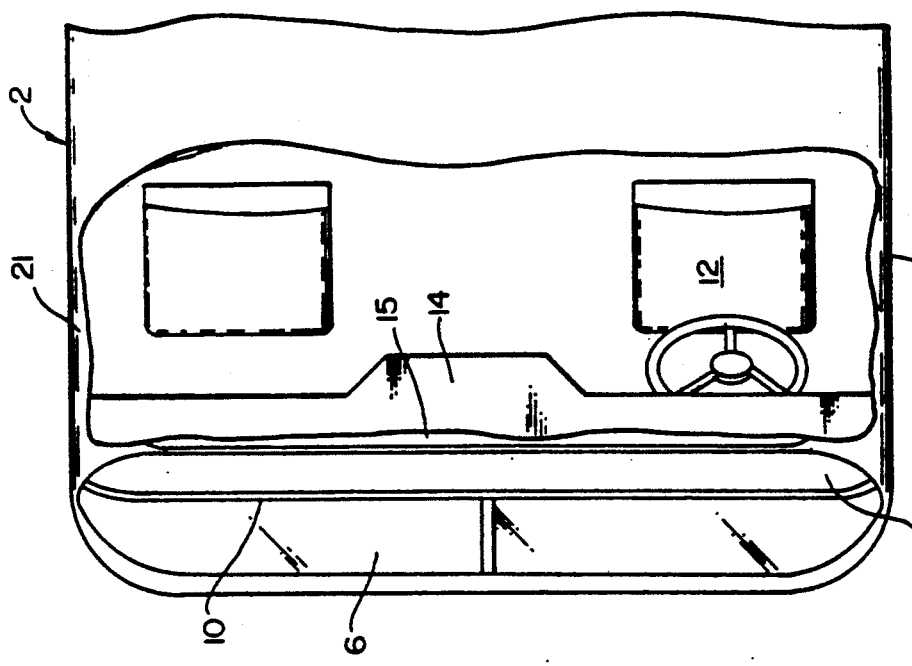
FIG. 3 is a horizontal section taken along the line 3—3 of FIG. 3.

In the embodiment of FIG. 5 the windshield 26 is a larger piece of glass and extends upwardly to form the window above the header and includes an area 9 above the window. The area 9 is clear glass that shields a set of marker lights 30 that are housed inside the cab rather than outside as is conventional.

From the foregoing it will be appreciated that, although a specific embodiment of the invention has been described herein for purposes of illustration, various modifications may be made without deviating from the spirit and scope of the invention. For example, the header could extend only over the operator's side of the cab and not the passenger's side. Furthermore, the header can contain a radio, reading lights, air vents, sun visors or other convenience features. Accordingly, the invention is not to be limited except as by the appended claims.

What is claimed is:

1. An apparatus for providing increased daylight illumination to the interior of a vehicle cab having an operator compartment with an operator's seat, the cab having a front surface at least partially defined by a front windshield, the apparatus comprised of:

a light transmissive window above the windshield directing daylight into the cab, said window forming part of the cab front surface;

a header located below the window, within the cab and overlying the operator's seat so that daylight does not shine directly onto an operator seated in the operator's seat;

whereby the daylight illuminates the operator compartment but is shielded from striking the eyes of an operator.

2. The apparatus according to claim 1 wherein said cab is enlarged to include an integral sleeper compartment, the header not blocking the daylight from entering the sleeper compartment.

3. The apparatus according to claim 1 wherein the header extends transversely across the entire width of the cab.

4. The apparatus according to claim 2 wherein the header extends transversely across the entire width of the cab.

5. The apparatus of claim 1 wherein the ceiling of the cab is coincident with the fairing.

6. The apparatus of claim 1 wherein the header extends rearwardly from the window to a length at least as far as one third the horizontal distance from the front of the operator's door.

7. The apparatus of claim 1 with the window and windshield being an integral piece of glass.

8. The apparatus of claim 7, the glass having an area above the window shielding marker lights located inside the cab but directed out through the glass.

9. A truck cab having a front windshield, and a glass area above the windshield for viewing a set of marker lights, said marker lights being located within the cab but shining through the glass area in front of the cab.

10. The cab of claim 9, said windshield having a window area, a header extending rearwardly from the windshield below the window area to block light entering the window area from directly striking the eyes of an operator seated in the cab.

11. A truck cab having a cab body with a roof, a front windshield, a seat for an operator in the cab, and an operator's door, the improvement comprising:

a glass area at the front of the cab above the windshield for allowing additional light to enter the cab, and a header extending into the cab rearwardly from the glass area a distance sufficient to block direct light entering the operator's eyes from entering above the header.

12. The cab of claim 1, wherein said glass area is integrated with said windshield.

13. The cab of claim 1, wherein said glass area is a separate piece of glass above the windshield.

14. The cab of claim 11, said header extending rearwardly at least one third the distance from the forward edge of the operator's door.

15. The cab of claim 11, wherein said glass area above the header includes a panel covering marker lights, and including marker lights mounted within the cab to shine out through said panel.

* * * * *